United States Patent
Park

(10) Patent No.: US 7,057,988 B2
(45) Date of Patent: Jun. 6, 2006

(54) DEVICE AND METHOD FOR CONTROLLING OPTICAL RECORDING/REPRODUCING DEVICE

(75) Inventor: Sang On Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/741,170

(22) Filed: Dec. 21, 2000

(65) Prior Publication Data

US 2001/0006501 A1    Jul. 5, 2001

(30) Foreign Application Priority Data

Dec. 30, 1999 (KR) .............................. 1999-67413

(51) Int. Cl.
*G11B 7/00* (2006.01)

(52) U.S. Cl. .......................... 369/47.39; 369/47.48; 369/44.27

(58) Field of Classification Search ............ 369/47.39, 369/47.48, 44.27; G11B 7/00
See application file for complete search history.

(56) References Cited

U.S. PATENT DOCUMENTS

| | | | | |
|---|---|---|---|---|
| 4,611,319 A | * | 9/1986 | Naito | |
| 5,163,035 A | * | 11/1992 | Horikiri | 369/47.39 |
| 5,289,450 A | * | 2/1994 | Mizumoto et al. | 369/53.37 |
| 5,442,604 A | * | 8/1995 | Osada | 369/44.11 |
| 5,457,671 A | * | 10/1995 | Takata et al. | 369/44.28 |
| 5,511,050 A | * | 4/1996 | Matsumoto et al. | 369/44.23 |
| 5,631,886 A | * | 5/1997 | Suzuki | 369/44.25 |
| 5,724,328 A | * | 3/1998 | Yanagi | |
| 5,768,227 A | * | 6/1998 | Baba | 369/44.28 |
| 5,769,697 A | * | 6/1998 | Nishio | 451/288 |
| 5,825,733 A | * | 10/1998 | Ogawa | 369/47.48 |
| 5,936,921 A | * | 8/1999 | Iimura | 369/47.25 |
| 6,081,490 A | * | 6/2000 | Kuroda et al. | 369/47.28 |
| 6,246,649 B1 | * | 6/2001 | Ohta et al. | 369/47.28 |
| 6,256,275 B1 | * | 7/2001 | Eguchi et al. | 369/44.32 |
| 6,266,305 B1 | * | 7/2001 | Buchler | 369/44.32 |
| 6,282,166 B1 | * | 8/2001 | Akiyama et al. | 369/275.3 |
| 6,298,021 B1 | * | 10/2001 | Aoki | 369/47.1 |
| 6,304,535 B1 | * | 10/2001 | Magome et al. | 369/53.2 |
| 6,324,136 B1 | * | 11/2001 | Yoshida et al. | 369/47.22 |
| 6,331,967 B1 | * | 12/2001 | Matsui et al. | 369/47.03 |
| 6,577,566 B1 | * | 6/2003 | Tomita | 369/44.26 |
| 6,614,740 B1 | * | 9/2003 | Park et al. | 369/59.17 |

* cited by examiner

*Primary Examiner*—A M Psitos
(74) *Attorney, Agent, or Firm*—Birch, Stewart, Kolasch & Birch, LLP

(57) ABSTRACT

Method and device for controlling an optical recording/reproducing device, for detecting a wobble signal in advance during free running when only a focus servo is turned on, carrying out wobble PLL, detecting the present rotating speed of the optical disk from the wobble signal, and controlling the spindle to reach to a target speed quickly, thereby stabilizing the servo in advance before regular data recording/reproduction, and enhancing performance of the optical recording/reproduction device.

19 Claims, 3 Drawing Sheets

DEVICE AND METHOD FOR CONTROLLING OPTICAL RECORDING/REPRODUCING DEVICE

BACKGROUND OF THE INVENTION

1. Field of the Invention

The present invention relates to an optical recording/reproducing device of a wobble structure, and more particularly, to method and device for controlling an optical recording/reproducing device, in which a wobble signal is detected at a time when an optical recording medium is not in a regular recording/reproducing state, and is used in a regular recording/reproducing state.

2. Background of the Related Art

In general, a rewritable optical recording medium, particularly, DVD-RAM, a rewritable optical disk, is provided with signal tracks of land and groove, for facilitating a tracking control even for an empty disk without any record of information signal. Recently, information signals are recorded on the lands as well as grooves respectively for increasing a density of recording. At the outset, neither control of, nor recording on the rewritable disk is possible as there is no information recorded thereon. Therefore, disk tracks are formed on the lands and grooves, information is recorded along the tracks, and information for random access and rotation control is recorded on the disk separately, for making the tracking control possible for an empty disk without any information signal recorded thereon. In this instance, the control information may be recorded at a header region at a start of every sector after pre-formatting the header region, or along the tracks in a wobbling form. The wobbling is recording of address information on a boundary surface of a track by using a fixed frequency or frequency modulation/phase modulation FM/PM for enhancing address recording or control.

In order to record or reproduce information at the optical recording device, the tracking and focus control are made through an optical pickup. FIG. 1 illustrates a block diagram of a related art optical recording/reproducing device, wherein the signal track of the optical disk 101 is provided with lands and grooves, for recording/reproducing data to/from, not only the land or groove tracks, but also both the land/groove tracks. There is an optical pickup 102 for directing an optical beam focused by an object lens to a signal track of the optical disk 101 under the control of the servo controlling part 106, and for receiving an optical beam reflected at a signal recording surface, focusing by means of the object lens again, and directing to an optical detector for detection of a focus error signal and a tracking error signal. The optical detector is provided with a plurality of optical detecting elements, each for providing an electrical signal proportional to a quantity of light obtained therefrom to a RF and servo error generating part 104. The RF and servo error generating part 104 combines the electrical signals, to generate a RF signal required for reproducing data, and a tracking error signal TE and a focus error signal FE both required for servo control, and the like. The tracking error signal TE is a signal generated by processing a read channel 2 signal, such as filtering and the like, and the RF signal is sometimes called as a read channel 1 signal. The RF signal is provided to a decoder 105 for reproduction, the servo error signals, such as FE and TE, are provided to the servo controlling part 106, and the control signals for data recording are provided to an encoder 103. The encoder 103 encodes a data to be recorded into recording pulses of a format the optical disk requires, and records the data on the optical disk 101 through the optical pickup 102, and the decoder 105 restores the RF signal into an original form of data.

In the meantime, there may be a host, such as PC, connected to the optical recording/reproducing device, for providing a recording/reproducing command to the microcomputer 111 through an interface 110, and the data to be recorded to the encoder, and provided with a reproduced data from the decoder 105. The microcomputer 111 controls the encoder 103, the decoder 105 and the servo controlling part 106 in response to recording/reproducing command from the host. In general, the interface 110 is an ATAPI (Advanced Technology Attached Packet Interface). That is, the ATAPI is an interface standard between optical recording/reproducing device, such as CD or DVD drive, and the host suggested for transferring a data decoded at the optical recording/reproducing device to the host, wherein the decoded data is converted into a protocol of a packet form for making the data to able to be processed by the host.

In the meantime, the servo controlling part 106 processes the focus error signal FE to generate a driving signal for controlling focus and provides the driving signal to the focus servo driving part 107, and processes the tracking error signal TE to generate a driving signal for tracking control and provides to the driving signal to the tracking servo driving part 108. The focus servo driving part 107 drives a focus actuator in the optical pickup 102, to move the optical pickup 102 in an up and down direction, so as to follow the up and down movement of the optical disk 101 while the optical disk 101 rotates. The tracking servo driving part 108 drives a tracking actuator in the optical pickup 102, to move the object lens of the optical pickup 102 in a radial direction, for correction of a beam position to follow a required track. The servo controlling part 106 detects rotation speed information of the disk from the RF signal and provides to a spindle servo 112. The spindle servo 112 subjects a spindle motor 113 to Phase Locked Loop (PLL) control in response to the rotation speed information, for rotating the disk 101. That is, the spindle motor 113 exerts a rotating force to a spindle (not shown), and the spindle transmits the rotation force given from the spindle motor 113 to the disk 101, for rotating the disk 101 at a desired speed.

In the meantime, as the servo is unstable before starting a regular tracking or just after seek, the optical recording/reproducing device can not track on at once. Therefore, in this case, it is required for the optical recording/reproducing device to run freely (i.e., the tracking servo is turned off, while the focus servo only is turned on) until an appropriate condition is reached. Then, the servo controlling part 106 runs the spindle at an appropriate speed after the free running, puts the tracking servo into operation, and attempts a wobble PLL. Consequently, the method has a problem in that performance of the optical recording/reproducing device is poor as the servo is stabilized after the free running.

SUMMARY OF THE INVENTION

Accordingly, the present invention is directed to method and device for controlling an optical recording/reproducing device that substantially obviates one or more of the problems due to limitations and disadvantages of the related art.

An object of the present invention is to provide method and device for controlling an optical recording/reproducing device, which can stabilize servos before a regular state comes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for controlling a device for recording/reproducing an optical recording medium having control information recorded in a wobbled form on a signal track, includes the steps of (a) detecting a wobbled signal from a signal track at a time a regular recording/reproducing of the optical recording medium is not carried out, for reading the control information, and (b) using the control information in the regular recording/reproduction.

The step (a) includes the steps of applying PLL to the detected wobbled signal, and reading the control information from the PLL applied wobble signal.

The control information is a spindle rotating speed.

The step (a) includes the step of generating a window signal in the vicinity of a track center of the optical recording medium, wherein the wobble PLL is carried out in a window section the window signal is active therein.

In another aspect of the present invention, there is provide a method for controlling a device for recording/reproducing an optical recording medium having control information recorded in a wobbled form on a signal track, including the steps of (a) detecting a wobbled signal from a signal track at a time a regular recording/reproducing of the optical recording medium is not carried out, for detecting the present rotating speed of the optical recording medium, (b) fixing a target rotating speed of the optical recording medium with reference to the detected present rotating speed of the optical recording medium, and controlling the optical recording medium to the target rotating speed, and (c) turning on a tracking servo for a regular recording/reproduction.

In further aspect of the present invention, there is provided a device for controlling a device for recording/reproducing an optical recording medium having control information recorded in a wobbled form on a signal track including a wobble detecting part for detecting a wobbled signal formed by wobbling from the signal track at a time a regular recording/reproducing of the optical recording medium is not carried out, an information reading part for reading control information from the detected wobble signal, and a servo controlling part for using the control information in a regular recording/reproduction.

The wobble detecting part subjects a difference signal of optical reflection signals at the optical recording medium to band pass filtering, for detecting the wobble signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
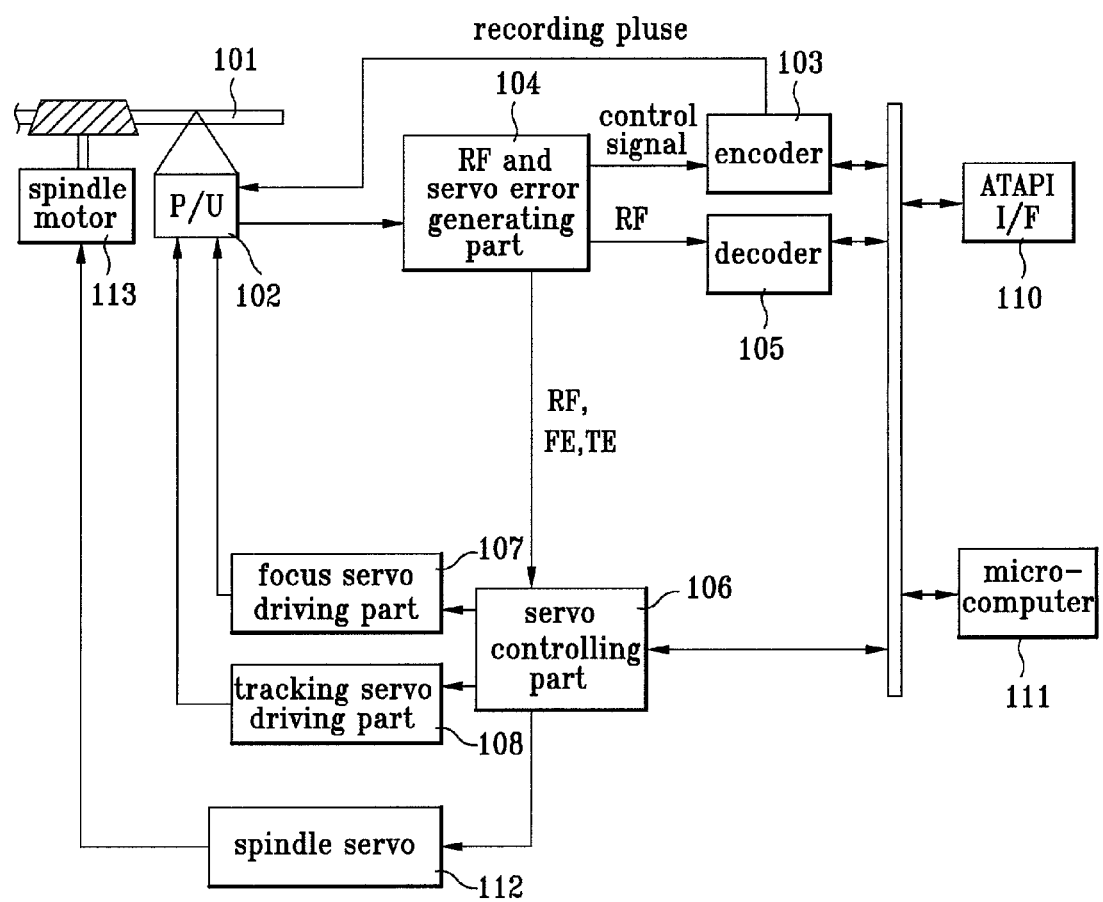
FIG. 1 illustrates a block diagram of a related art optical recording/reproducing device.
Figure 2:
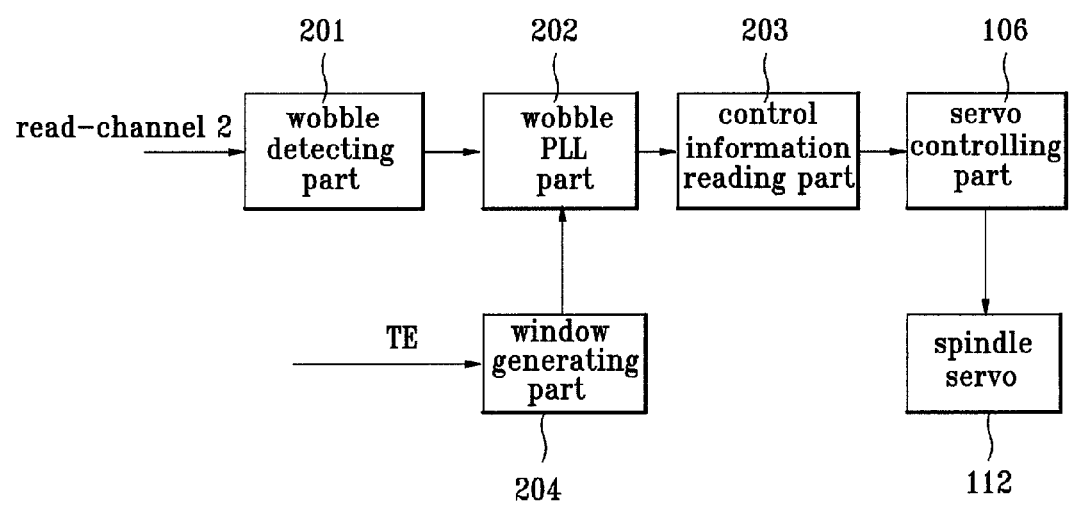
FIG. 2 illustrates a block diagram of an optical recording/reproducing device in accordance with a preferred embodiment of the present invention.

Reference will now be made in detail to the preferred embodiments of the present invention, examples of which are illustrated in the accompanying drawings. FIG. 2 illustrates a block diagram of a control device of an optical recording/reproducing device in accordance with a preferred embodiment of the present invention, inclusive of a wobble detecting part 201 for subjecting a read channel 2 signal generated at a RF and servo error generating part 104 to band pass filtering, to detect a wobble signal formed on a signal track; a wobble PLL part 202 for applying PLL to the wobble signal; an information reading part 203 for reading control information, i.e., a spindle rotation speed, from the wobble signal having PLL applied thereto, and providing to the servo controlling part 106; and a window generating part 204 for receiving a TE signal from the RF and servo error generating part 104 to provide a window signal only in the vicinity of a track center. The wobble PLL part 202 conducts wobble PLL within a section of the window section only.

Figure 3:
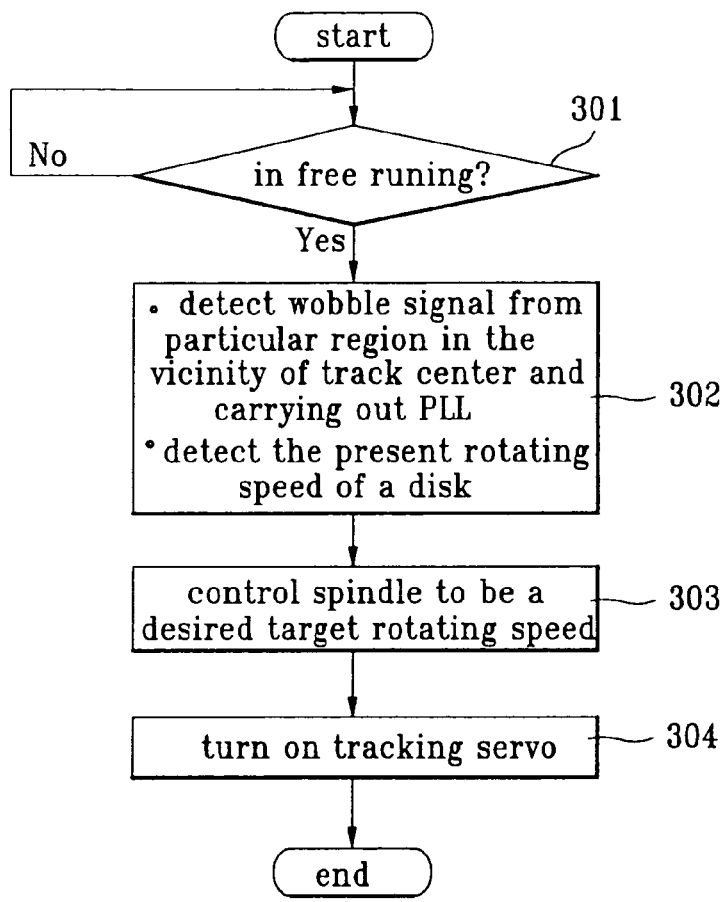
FIG. 3 illustrates a flow chart showing the steps of a method for controlling an optical recording/reproducing device in accordance with a preferred embodiment of the present invention; and, FIG. 4 illustrates an operative waveform of the present invention showing an example of a wobble signal detection only in the vicinity of a center of track and carrying out a wobble PLL.

FIG. 3 illustrates a flow chart showing the steps of a method for controlling an optical recording/reproducing device in accordance with a preferred embodiment of the present invention.

If the optical recording/reproducing device is in a free running state, i.e., if the tracking servo is turned off, and only the focusing servo is turned on (step 301), a wobble detecting part 201 detects a wobble signal on a signal track, and the wobble PLL part 202 conducts wobble PLL for subjecting the detected wobble signal to PLL (step 302). In the wobble PLL, the wobble signal recorded on the signal track is detected and PLL is applied thereto. In general, the wobble signal is detected from the read channel 2 signal. That is, the wobble detecting part 201 subjects the read channel 2 signal from the RF and servo error generating part 104 to band pass filtering for a particular band, for detecting the wobble signal recorded on the signal track.

Figure 4:
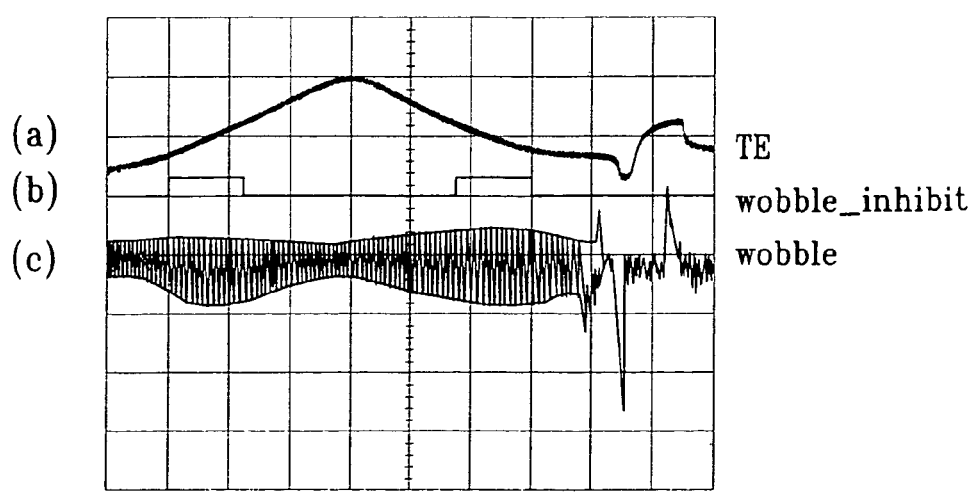

As there may be cases when detection of the wobble signal is poor owing to defect on the disk, or the like the wobble PLL is conducted at a region that the detection of the wobble signal is good. In general, when the tracking error signal TE has a center level as shown by (a) in FIG. 4, i.e., when the optical head passes through a center of the track, the detection of the wobble signal is very good as shown by (c) in FIG. 4. That is, the wobble signal detection is the best in the vicinity of the track center. Therefore, the present invention takes conduction of the wobble PLL only in the vicinity of the track center as embodiments.

There are different methods for detecting in the vicinity of the track center, and one embodiment of the present invention may use, for an example, a Track Zero Crossing TZC signal. The TZC signal is a signal switched at a zero cross of the tracking error signal obtainable by slicing the TE signal at an internal reference level, i.e., a center level of the tracking error signal TE. Then, certain forward and rear portions of a rising edge and a falling edge of the TZC signal are set up as the window section. When the window signal is generated in the vicinity of the track center as shown by (b) in FIG. 4 through the window generating part 204, the wobble PLL part 202 conducts the wobble PLL only within the window section in which the window signal is active, and inhibits the wobble PLL in the rest of the sections. The control information reading part 203 detects the present rotating speed of the optical disk from the wobble signal having PLL applied thereto and provides to the servo controlling part 106. The servo controlling part 106 fixes a target rotating speed from the present rotating speed of the optical disk, and provides to the spindle servo 112. Then, the spindle servo 112 speeds up or down a rotation speed of the spindle by using the spindle motor 113, so that the optical disk 101 reaches to the target speed quickly (step 303). That is, since the present rotating speed of the disk can be known upon applying PLL to the detected wobble signal, the spindle (i.e., the optical disk) can be controlled to reach to the desired target speed, quickly. At the same time, the tracking servo is turned on (step 304) through the servo controlling part 106. That is, once the spindle speed is stabilized, a tracking on can be conducted, quickly and with stability. Thus, because the spindle can be controlled to be a desired speed automatically before regular servo, i.e., regular recording/reproduction, the servo can be stabilized, quickly.

As has been explained, the method and device for controlling an optical recording/reproducing device of the present invention has the following advantages.

During free running which is not a regular recording/reproduction, but only the focus servo is turned on, by detecting a wobble signal in advance, conducting wobble PLL, detecting the present rotating speed of the optical disk, and controlling the spindle to reach to a target rotating speed quickly, a performance of the optical recording/reproducing device can be enhanced because the servo can be stabilized before regular recording/reproduction.

It will be apparent to those skilled in the art that various modifications and variations can be made in the method and device for controlling an optical recording/reproducing device of the present invention without departing from the spirit or scope of the invention. Thus, it is intended that the present invention cover the modifications and variations of this invention provided they come within the scope of the appended claims and their equivalents.

What is claimed is:

1. A method for controlling a recording or reproducing of information on or from an optical recording medium having control information recorded in a wobbled form on a signal track, the method comprising the steps of:
   (a) detecting a wobbled signal from the signal track for reading the control information to adjust a rotating speed of the optical recording medium, wherein said detecting step is carried out in a free running state in which a focus servo is turned on and a tracking servo is turned off; and
   (b) performing tracking control using the tracking servo after adjusting the rotating speed of the optical recording medium.

2. A method as claimed in claim 1, wherein the step (a) includes the steps of
   applying the detected wobbled signal to a phase locked loop (PLL); and
   applying the detected wobbled signal having the PLL applied thereto to adjust the rotating speed of the optical recording medium.

3. A method as claimed in claim 1, wherein the control information is a spindle rotating speed.

4. A method as claimed in claim 1, wherein the step (a) includes identifying a plurality of sections of the optical recording medium, and
   carrying out wobble PLL in a first section of the plurality of sections of the optical recording medium and inhibiting the wobble PLL in remaining sections of the plurality of sections.

5. A method as claimed in claim 1, wherein the step (a) includes
   generating a window signal in the vicinity of a track center of the optical recording medium, and
   identifying at least one window section of the recording medium,
   wherein the wobble PLL is carried out in a window section having an active window signal.

6. A method as claimed in claim 5, wherein the step of generating a window signal includes the step of setting up a plurality of sections with reference to a rising edge and a falling edge of a Track Zero Crossing (TZC) signal turned on/off at a zero cross position of a tracking error signal as the window sections.

7. A method for controlling a recording or reproducing of information on or from an optical recording medium having control information recorded in a wobbled form on a signal track, the method comprising the steps of:
   (a) detecting a wobbled signal from the signal track for detecting the present rotating speed of the optical recording medium, wherein said detecting step is carried out in a free running state in which a focus servo is turned on and a tracking servo is turned off;
   (b) fixing a target rotating speed of the optical recording medium with reference to the detected present rotating speed of the optical recording medium, and controlling the optical recording medium to the target rotating speed; and
   (c) turning on a tracking servo for a regular recording or reproduction after the target rotating speed of the optical recording medium has been fixed with reference to the wobbled signal.

8. A method as claimed in claim 7, further comprising:
   subjecting a difference signal of optical reflection signals at the optical recording medium to band pass filtering to detect the wobbled signal.

9. A method as claimed in claim 7, wherein the step (a) includes the steps of
   applying the wobbled signal to a phase lock loop (PLL); and
   detecting the present rotating speed of the optical recording medium from the wobbled signal having the PLL applied thereto.

10. A method as claimed in claim 7, wherein the step (a) includes generating a window signal in the vicinity of a track center of the optical recording medium, and
   identifying at least one window section in the recording medium wherein the application of PLL to the wobbled signal is conducted within a window section having an active window signal, and the application of PLL to the wobbled signal is inhibited in remaining sections.

11. A method as claimed in claim 10, wherein the step of generating a window signal includes the step of setting up certain sections with reference to a rising edge and a falling edge of a Track Zero Crossing (TZC) signal turned on/off at a zero cross position of the tracking error signal as the window sections.

12. A device for controlling a recording or reproducing of information on or from an optical recording medium having control information recorded in a wobbled form on a signal track, the device comprising:
   a tracking servo for performing tracking control on the optical recording medium;
   a wobble detecting part for detecting a wobbled signal formed by wobbling from the signal track at a time when a focus servo is turned on and the tracking servo is not operating;
   an information reading part for reading control information from the detected wobbled signal; and
   a servo controlling part for using the control information to adjust a rotating speed of the optical recording medium.

13. A device as claimed in claim 12, wherein the wobble detecting part detects the wobbled signal by subjecting a difference signal of optical reflection signals at the optical recording medium to band pass filtering.

14. A device as claimed in claim 12, further comprising a phase lock loop (PLL), the detected wobble signal being applied to the PLL, the information reading part reads the control information from the wobble signal having PLL applied thereto.

15. A device as claimed in claim 12, wherein the control information is a rotating speed of the optical recording medium.

16. A device as claimed in claim 12, wherein the optical recording medium has a plurality of sections and the information reading part conducts wobble PLL only to one section of the plurality of sections of the optical recording medium, and inhibits the wobble PLL in remaining sections of the plurality of sections.

17. A device as claimed in claim 12, wherein the information reading part includes a window generating part for generating a window signal in the vicinity of a track center of the optical recording medium, to carry out wobble PLL within a window section the window signal is active therein.

18. A device as claimed in claim 17, wherein the window generating part sets up certain sections with reference to a rising edge and a falling edge of a Track Zero Crossing (TZC) signal turned on/off at a zero cross position of the tracking error signal as the window sections.

19. A device as claimed in claim 12, wherein the servo controlling part controls a spindle to be at a target rotating speed, and turns on a tracking servo.

* * * * *